United States Patent [19]

Bennoit et al.

[11] 4,260,495

[45] Apr. 7, 1981

[54] PROCESS FOR THE FILTRATION OF ZEOLITE SUSPENSIONS

[75] Inventors: Horst Bennoit, Sulzbach; Dieter Schmid, Schwalbach, both of Fed. Rep. of Germany

[73] Assignee: Hoechst Aktiengesellschaft, Frankfurt am Main, Fed. Rep. of Germany

[21] Appl. No.: 60,148

[22] Filed: Jul. 24, 1979

Related U.S. Application Data

[63] Continuation of Ser. No. 900,610, Apr. 27, 1978, abandoned.

[30] Foreign Application Priority Data

Apr. 30, 1977 [DE] Fed. Rep. of Germany ....... 2719425

[51] Int. Cl.$^3$ ............................................. C01B 33/28
[52] U.S. Cl. .................................... 210/772; 423/328
[58] Field of Search ................. 210/66, 68, 70, 79–82; 252/455 Z; 423/328–330

[56] References Cited

U.S. PATENT DOCUMENTS

| | | | |
|---|---|---|---|
| 2,882,243 | 4/1959 | Milton | 423/239 |
| 2,904,412 | 9/1959 | McBride et al. | 210/66 |
| 3,374,182 | 3/1968 | Young | 423/328 |
| 3,499,530 | 3/1970 | McKay | 210/68 |
| 4,073,867 | 2/1978 | Roebke et al. | 423/328 |

FOREIGN PATENT DOCUMENTS 1038017  9/1958  Fed. Rep. of Germany .

OTHER PUBLICATIONS

Savitsky, A. C., Soap/Cosmetics/Chemical Specialties, vol. 53, No. 3 (Mar. 1977), pp. 29–31 & 64–66.

Zhdanov, S. P., "Chemical Aspects of Zeolite Crystallisation from Alkali Aluminosilicate Gels", Paper Presented at the School of Pharmacy (University of London), Apr. 4th–6th, 1967.

*Primary Examiner*—Ivars C. Cintins
*Attorney, Agent, or Firm*—Curtis, Morris & Safford

[57] ABSTRACT

Zeolites are prepared by hydrothermal crystallization of alkaline aqueous synthesis mixtures. Normally the zeolites are filtered and washed with water until the filtrate shows a pH of about 9 to 12. Sometimes, especially if the resulting zeolite consists of very fine particles, the zeolite filter cake shows thixotropic properties.

If the filter cake is washed with diluted sodium hydroxide or only small amounts of water this thixotropy can be avoided.

3 Claims, No Drawings

PROCESS FOR THE FILTRATION OF ZEOLITE SUSPENSIONS

This is a continuation of application Ser. No. 900,610, filed Apr. 27, 1978, now abandoned.

The present invention relates to a process for improving the rheological properties of moist washed out zeolites, especially of the sodium form. Zeolites are aluminum silicates which may be used inter alia as molecular sieves, water softeners and as starting materials for preparing cracking catalysts.

Zeolites are generally prepared by hydrothermal crystallization of aqueous synthetic mixtures containing alkali metal oxide such as sodium oxide, silicon dioxide and aluminum oxide. As starting materials there are employed in most cases aluminum hydroxide and aqueous solutions of alkali metal hydroxide and alkali metal silicate, such as sodium silicate; however, processes are also known which start from alumosilicate minerals such as kaolin and sodium hydroxide solution.

The synthesis is generally carried out in the following manner:

First an amorphous precipitation product is prepared by uniting a sodium aluminate solution (prepared from aluminum hydroxide and sodium hydroxide) with a sodium silicate solution, which product recrystallizes to give the zeolite when being further contacted with the mother liquor at a temperature of from 20° to 80° C., preferably 50° to 105° C. In most cases the time needed for recrystallization is between 20 minutes and 24 hours. More details with regard to the hydrothermal synthesis of zeolites are available from the book D. W. BRECK, Zeolites, Molecular Sieves, John Wiley, New York, 1974, pages 245–347.

After the recrystallization is complete, the zeolite is separated from the highly alkaline mother liquor by filtration and the filter cake is washed with water, until the pH of the filtrate is in the range of from about 9 to 12 (cf. German Auslegeschrift No. 1,038,017; column 3). pH values of from 10 to 11 are said to be particularly advantageous. After washing, the zeolite is dried.

The technical interest in zeolites having very fine particles has increased in recent years, after it has been known that for the use of substitutes in detergents fine grained products are required. However, difficulties occur during the synthesis and subsequent filtration of zeolites of this type, owing to the fact they have fine particles and owing to the thixotropic properties of the filter cake.

Already very low forces of gravity which act on the filter cakes, may liquefy the latter. This characteristic of the filter cakes becomes, particularly noticeable, after it has been partially or completely freed of impurities due to its preparation by using water. A washed moist zeolite may tend to behave thixotropically to such a degree that the mere removal of the vacuum at the suction filter suffices to make the filter cake liquefy. Thus, it is rather difficult in practice to remove the zeolite completely from the filter cloth.

It was, consequently, an object of the present invention to find a process for obtaining zeolites, especially micro crystalline zeolites, which does not have the abovementioned disadvantages.

The present invention, consequently, provides a process for separating zeolite crystals by filtration from the mother liquor obtained during the hydrothermal synthesis, which comprises filtering the crystal slurry and washing the filter cake which mainly consists of zeolite with aqueous sodium hydroxide solution (having a strength of 0.05 to 2% by weight). According to this process, great amounts of washing liquid may be used and a liquefaction of the filter cake does not occur.

The concentration of the sodium hydroxide solution may vary within wide limits. Advantageously, however, it is chosen as low as possible in order to keep the contamination of the filter cake with sodium hydroxide low. Sodium hydroxide solutions which have a content of NaOH of from 0.06 to 1.6, preferably of from 0.2 to 1.0% by weight, are preferred. When using sodium hydroxide solutions of this concentration, the filter cake can be treated with sufficiently great quantities of washing liquid and no thixotropy occurs.

The process according to the invention is particularly suitable for filtering zeolites of the sodium form and zeolites of the type A.

A liquefaction of the filter cake is observed especially in the case of zeolites having fine particles. Products having fine particles include those in which at least 50% by weight of the particles are smaller than 10 $\mu$m. The liquefaction is particularly pronounced in the case of products in which at least 50% by weight of the particles are smaller than 4 $\mu$m. These values are calculated on the particles size distribution of the zeolite particles which are present in suspension or in the moist filter cake.

The optimum concentration of the sodium hydroxide solution is suitably determined by preliminary tests. The finer the particles of the zeolite to be filtered, the higher it should be. However, a liquefaction may occur even if the content of alkali hydroxide of the washing liquid is chosen too low and if great quantities of washing liquid are used.

It has furthermore been found that the liquefaction of the filter cake can also be avoided when the washing liquid employed is distilled water. However, to achieve this object only very small quantities of washing water may be employed, which are generally insufficient to remove impurities of the mother liquor from the filter cake. However, it is possible to wash the filter cake first with water and subsequently with dilute sodium hydroxide solution according to the invention. The right amount of water can be easily determined by short tests.

The effect of the sodium hydroxide solution according to the invention is surprising especially since other compounds in the same concentration, for example ammonium hydroxide, sodium carbonate, sodium aluminate and sodium sulfate, have proved ineffective.

The following examples illustrate the invention:

EXAMPLE 1

500 ml of a suspension of zeolite A in mother liquor are applied onto a single layer hand filter of a filtering area of 0.01 m² and subsequently suction-filtered. The obtained product is washed thereafter with 25 ml of distilled water. A solid filter cake is formed which does not change its consistency even after the vacuum has been removed. The test is repeated using 50 ml of water. Upon aeration, the filter cake liquefies.

The average particle size of the zeolite crystals in the suspension is 2.3 $\mu$m, that is to say that 50% by weight of the particles are smaller than 2.3 $\mu$m.

EXAMPLE 2

Analogously to Example 1, the zeolite A suspension having an average particle size of 5.8 $\mu$m is filtered, whereby the suspension is applied in such an amount that the same quantity of solid as in Example 1 is retained on the filter. The filtrate may be washed with 50 ml of distilled water and no liquefaction of the filter cake occurs. The filter cake liquefies only when increasing the quantity of washing water to 75 ml.

EXAMPLE 3

Filtration tests are carried out using the zeolite suspensions of Examples 1 and 2, with the exception that the washing liquid used is an aqueous solution of NaOH.

The results are summarized in the following table:

| average particle size of the zeolite | washing liquid concentration of NaOH | quantity | state of the filter cake after removal of the vacuum |
|---|---|---|---|
|  |  | 100 ml | solid |
| 2.3 μm | 0.5 weight % | 200 ml | limiting state solid liquid |
|  |  | 300 ml | liquid |
|  |  | 100 ml | solid |
| 2.3 μm | 0.75 weight % | 200 ml | " |
|  |  | 300 ml | " |
|  |  | 100 ml | solid |
| 5.8 μm | 0.5 weight % | 300 ml | " |

EXAMPLE 4

The example is carried out using the zeolite suspension of Example 1. The zeolite crystals are separated from the mother liquor on a belt filter (filtering area 0.8 m²). As washing liquid, 140 ml of sodium hydroxide solution to 0.75% by weight strength are employed per 500 ml of applied suspension. The filter cake remains solid and can be removed from the filter cloth by means of the usual discharge device. When washing with the same quantity of distilled water instead of sodium solution, the filtered product liquefies before reaching the discharge position.

What is claimed is:

1. Process for separating zeolite A crystals by filtration from a mother liquor obtained during a hydrothermal synthesis of zeolite A, which consists essentially of filtering the crystal slurry and washing the filter cake mainly consisting of zeolite A with an aqueous 0.05 to 2% by weight sodium hydroxide solution and removing the solid washed filter cake from the filter.

2. Process as claimed in claim 1, which comprises using as an aqueous washing solution a dilute sodium hydroxide solution having a content of NaOH of from 0.2 to 1.0% by weight.

3. Process as claimed in claim 1, in which at least 50% by weight of the particles of the zeolite A to be filtered are smaller than 4 μm.

* * * * *